US010284499B2

(12) United States Patent
Lee

(10) Patent No.: US 10,284,499 B2
(45) Date of Patent: May 7, 2019

(54) DEDICATED CONTROL PATH ARCHITECTURE FOR SYSTEMS OF DEVICES

(71) Applicant: ARRIS Enterprises LLC, Suwanee, GA (US)

(72) Inventor: Michael Lee, San Jose, CA (US)

(73) Assignee: ARRIS Enterprises LLC, Suwanee, GA (US)

( * ) Notice: Subject to any disclaimer, the term of this patent is extended or adjusted under 35 U.S.C. 154(b) by 0 days.

(21) Appl. No.: 14/463,419

(22) Filed: Aug. 19, 2014

(65) Prior Publication Data

US 2015/0055452 A1  Feb. 26, 2015

Related U.S. Application Data

(60) Provisional application No. 61/868,982, filed on Aug. 22, 2013.

(51) Int. Cl.
*H04L 12/931* (2013.01)
*H04L 12/939* (2013.01)

(52) U.S. Cl.
CPC ........... *H04L 49/351* (2013.01); *H04L 49/00* (2013.01); *H04L 49/557* (2013.01)

(58) Field of Classification Search
CPC ..................... H04L 49/351; H04L 45/583
See application file for complete search history.

(56) References Cited

U.S. PATENT DOCUMENTS

| 4,625,308 | A | * | 11/1986 | Kim | ..................... H04B 7/2123 370/321 |
| 5,481,073 | A | | 1/1996 | Singer et al. | |
| 5,651,003 | A | | 7/1997 | Pearce et al. | |
| 5,727,170 | A | | 3/1998 | Mitchell et al. | |
| 6,111,672 | A | * | 8/2000 | Davis | .................. H04J 14/0227 398/1 |

(Continued)

FOREIGN PATENT DOCUMENTS

| CN | 1441580 A | 9/2003 |
| CN | 1791064 A | 6/2006 |

(Continued)

OTHER PUBLICATIONS

Office Action dated Jul. 16, 2015; U.S. Appl. No. 14/094,931; (41 pgs.).

(Continued)

*Primary Examiner* — Noel R Beharry
*Assistant Examiner* — Ruihua Zhang
(74) *Attorney, Agent, or Firm* — Stewart M. Wiener

(57) ABSTRACT

A dedicated control path architecture for systems of devices, such as stacking systems, is provided. In one embodiment, a network device for use in a system of devices can comprise a CPU complex; a first set of ports for establishing a data path between the network device and other network devices in the system of devices; and a second set of ports for establishing a control path between the network device and the other network devices in the system of devices. The control path can be separate from the data path and can allow the CPU complex to exchange control plane traffic with other CPU complexes resident in the other network devices.

21 Claims, 9 Drawing Sheets

(56) References Cited

U.S. PATENT DOCUMENTS

| | | | |
|---|---|---|---|
| 6,243,756 B1* | 6/2001 | Whitmire | H04L 12/4625 358/1.13 |
| 6,366,582 B1 | 4/2002 | Nishikado et al. | |
| 6,373,840 B1 | 4/2002 | Chen | |
| 6,490,276 B1 | 12/2002 | Salett et al. | |
| 6,496,502 B1 | 12/2002 | Fite, Jr. et al. | |
| 6,516,345 B1 | 2/2003 | Kracht | |
| 6,526,345 B2 | 2/2003 | Ryoo | |
| 6,597,658 B1 | 7/2003 | Simmons | |
| 6,725,326 B1 | 4/2004 | Patra et al. | |
| 6,765,877 B1 | 7/2004 | Foschiano et al. | |
| 6,807,182 B1* | 10/2004 | Dolphin | H04L 45/00 370/401 |
| 6,839,342 B1 | 1/2005 | Parham et al. | |
| 6,839,349 B2 | 1/2005 | Ambe et al. | |
| 6,850,542 B2 | 2/2005 | Tzeng | |
| 7,093,027 B1 | 8/2006 | Shabtay et al. | |
| 7,099,315 B2 | 8/2006 | Ambe et al. | |
| 7,106,736 B2 | 9/2006 | Kalkunte | |
| 7,136,289 B2 | 11/2006 | Vasavda et al. | |
| 7,184,441 B1 | 2/2007 | Kadambi et al. | |
| 7,206,283 B2 | 4/2007 | Chang et al. | |
| 7,206,309 B2* | 4/2007 | Pegrum | H04L 12/4625 370/217 |
| 7,274,694 B1 | 9/2007 | Cheng et al. | |
| 7,313,667 B1 | 12/2007 | Pullela et al. | |
| 7,327,727 B2 | 2/2008 | Rich et al. | |
| 7,336,622 B1 | 2/2008 | Fallis et al. | |
| 7,426,179 B1 | 9/2008 | Harshavardhana et al. | |
| 7,480,258 B1 | 1/2009 | Shuen et al. | |
| 7,496,096 B1 | 2/2009 | Dong et al. | |
| 7,523,227 B1 | 4/2009 | Yager et al. | |
| 7,561,527 B1 | 7/2009 | Katz et al. | |
| 7,565,343 B2 | 7/2009 | Watanabe | |
| 7,602,787 B2 | 10/2009 | Cheriton | |
| 7,697,419 B1 | 4/2010 | Donthi | |
| 7,933,282 B1 | 4/2011 | Gupta et al. | |
| 7,962,595 B1 | 6/2011 | Jabbar | |
| 8,209,457 B2 | 6/2012 | Engel et al. | |
| 8,307,153 B2 | 11/2012 | Kishore | |
| 8,750,144 B1 | 6/2014 | Zhou et al. | |
| 8,949,574 B2 | 2/2015 | Slavin | |
| 9,032,057 B2 | 5/2015 | Agarwal et al. | |
| 9,038,151 B1* | 5/2015 | Chua | H04L 45/02 709/223 |
| 9,148,387 B2 | 9/2015 | Lin et al. | |
| 9,185,049 B2 | 11/2015 | Agarwal et al. | |
| 9,269,439 B1 | 2/2016 | Levy et al. | |
| 9,282,058 B2 | 3/2016 | Lin et al. | |
| 9,313,102 B2 | 4/2016 | Lin et al. | |
| 9,559,897 B2 | 1/2017 | Lin et al. | |
| 9,577,932 B2 | 2/2017 | Ravipati et al. | |
| 9,628,408 B2 | 4/2017 | Janardhanan et al. | |
| 9,660,937 B2 | 5/2017 | Agarwal et al. | |
| 9,692,652 B2 | 6/2017 | Lin et al. | |
| 9,692,695 B2 | 6/2017 | Lin et al. | |
| 2001/0042062 A1 | 11/2001 | Tenev et al. | |
| 2002/0046271 A1 | 4/2002 | Huang | |
| 2002/0101867 A1 | 8/2002 | O'Callaghan et al. | |
| 2003/0005149 A1 | 1/2003 | Haas et al. | |
| 2003/0081556 A1 | 5/2003 | Woodall | |
| 2003/0137983 A1 | 7/2003 | Song | |
| 2003/0169734 A1 | 9/2003 | Lu et al. | |
| 2003/0174719 A1 | 9/2003 | Sampath et al. | |
| 2003/0182483 A1 | 9/2003 | Hawkins | |
| 2003/0188065 A1 | 10/2003 | Golla et al. | |
| 2005/0063354 A1 | 3/2005 | Garnett et al. | |
| 2005/0141513 A1 | 6/2005 | Oh et al. | |
| 2005/0198453 A1 | 9/2005 | Osaki | |
| 2005/0243739 A1 | 11/2005 | Anderson et al. | |
| 2005/0271044 A1 | 12/2005 | Hsu et al. | |
| 2006/0013212 A1 | 1/2006 | Singh et al. | |
| 2006/0023640 A1 | 2/2006 | Chang et al. | |
| 2006/0072571 A1 | 4/2006 | Navada et al. | |
| 2006/0077910 A1 | 4/2006 | Lundin et al. | |
| 2006/0080498 A1 | 4/2006 | Shoham et al. | |
| 2006/0092849 A1 | 5/2006 | Santoso et al. | |
| 2006/0092853 A1 | 5/2006 | Santoso et al. | |
| 2006/0114899 A1 | 6/2006 | Toumura et al. | |
| 2006/0176721 A1 | 8/2006 | Kim et al. | |
| 2006/0187900 A1 | 8/2006 | Akbar | |
| 2006/0253557 A1 | 11/2006 | Talayco et al. | |
| 2006/0280125 A1 | 12/2006 | Ramanan et al. | |
| 2006/0294297 A1 | 12/2006 | Gupta | |
| 2007/0081463 A1 | 4/2007 | Bohra et al. | |
| 2007/0121673 A1 | 5/2007 | Hammer | |
| 2007/0147271 A1 | 6/2007 | Nandy et al. | |
| 2007/0174537 A1 | 7/2007 | Kao et al. | |
| 2007/0291660 A1 | 12/2007 | Robson et al. | |
| 2008/0082661 A1* | 4/2008 | Huber | H04L 41/046 709/224 |
| 2008/0137530 A1 | 6/2008 | Fallis et al. | |
| 2008/0192754 A1 | 8/2008 | Ku et al. | |
| 2008/0212497 A1 | 9/2008 | Getachew et al. | |
| 2008/0259555 A1* | 10/2008 | Bechtolsheim | G06F 13/409 361/679.4 |
| 2008/0275975 A1 | 11/2008 | Pandey et al. | |
| 2008/0281947 A1 | 11/2008 | Kumar | |
| 2009/0125617 A1 | 5/2009 | Klessig et al. | |
| 2009/0135715 A1 | 5/2009 | Bennah | |
| 2009/0141641 A1 | 6/2009 | Akahane et al. | |
| 2010/0172365 A1 | 7/2010 | Baird et al. | |
| 2010/0182933 A1 | 7/2010 | Hu et al. | |
| 2010/0185893 A1 | 7/2010 | Wang et al. | |
| 2010/0257283 A1 | 10/2010 | Agarwal | |
| 2010/0284414 A1* | 11/2010 | Agarwal | H04L 49/351 370/401 |
| 2010/0293200 A1 | 11/2010 | Assarpour | |
| 2010/0329111 A1 | 12/2010 | Wan et al. | |
| 2011/0092202 A1 | 4/2011 | Mattisson et al. | |
| 2011/0142077 A1 | 6/2011 | Wong et al. | |
| 2011/0238923 A1 | 9/2011 | Hooker et al. | |
| 2011/0268123 A1 | 11/2011 | Kopelman et al. | |
| 2011/0280258 A1 | 11/2011 | Klingen | |
| 2012/0020373 A1 | 1/2012 | Subramanian et al. | |
| 2012/0087232 A1 | 4/2012 | Hanabe et al. | |
| 2012/0131123 A1* | 5/2012 | Yan | H04L 49/55 709/208 |
| 2012/0155485 A1 | 6/2012 | Saha et al. | |
| 2012/0246400 A1 | 9/2012 | Bhadra et al. | |
| 2013/0170495 A1 | 7/2013 | Suzuki et al. | |
| 2013/0201984 A1 | 8/2013 | Wang | |
| 2013/0215791 A1 | 8/2013 | Lin et al. | |
| 2013/0232193 A1 | 9/2013 | Ali et al. | |
| 2013/0262377 A1 | 10/2013 | Agarwal | |
| 2014/0003228 A1 | 1/2014 | Shah et al. | |
| 2014/0006706 A1 | 1/2014 | Wang | |
| 2014/0071985 A1 | 3/2014 | Kompella et al. | |
| 2014/0075108 A1 | 3/2014 | Dong et al. | |
| 2014/0112190 A1* | 4/2014 | Chou | H04L 41/0213 370/254 |
| 2014/0112192 A1* | 4/2014 | Chou | H04L 41/042 370/254 |
| 2014/0122791 A1 | 5/2014 | Fingerhut | |
| 2014/0126354 A1 | 5/2014 | Hui et al. | |
| 2014/0153573 A1 | 6/2014 | Ramesh et al. | |
| 2014/0181275 A1 | 6/2014 | Lin et al. | |
| 2014/0269402 A1 | 9/2014 | Vasseur et al. | |
| 2014/0314082 A1 | 10/2014 | Korpinen et al. | |
| 2014/0334494 A1 | 11/2014 | Lin et al. | |
| 2014/0341079 A1 | 11/2014 | Lin et al. | |
| 2014/0341080 A1 | 11/2014 | Lin et al. | |
| 2014/0362852 A1* | 12/2014 | Janardhanan | H04Q 3/645 370/360 |
| 2014/0376361 A1 | 12/2014 | Hui et al. | |
| 2015/0016277 A1 | 1/2015 | Smith et al. | |
| 2015/0036479 A1 | 2/2015 | Gopalarathnam | |
| 2015/0117263 A1 | 4/2015 | Agarwal et al. | |
| 2015/0124826 A1 | 5/2015 | Edsall et al. | |
| 2015/0229565 A1 | 8/2015 | Ravipati et al. | |
| 2015/0271861 A1 | 9/2015 | Li et al. | |
| 2015/0281055 A1 | 10/2015 | Lin et al. | |
| 2015/0288567 A1 | 10/2015 | Lin et al. | |
| 2016/0021697 A1 | 1/2016 | Vargantwar et al. | |

(56) References Cited

U.S. PATENT DOCUMENTS

| | | | |
|---|---|---|---|
| 2016/0028652 | A1 | 1/2016 | Agarwal et al. |
| 2016/0173332 | A1 | 6/2016 | Agarwal et al. |
| 2016/0173339 | A1 | 6/2016 | Lin et al. |

FOREIGN PATENT DOCUMENTS

| | | |
|---|---|---|
| CN | 101478435 A | 7/2009 |
| CN | 102684999 A | 9/2012 |
| EP | 2924927 A1 | 9/2015 |
| WO | 2015026950 A1 | 2/2015 |

OTHER PUBLICATIONS

Extended European Search Report dated Jul. 30, 2015 for EP Appln. 15000834.0; 8 pages.
Pei et al.: "Putting Routing Tables in Silicon", IEEE Network, IEEE Service Center, New York, NY; vol. 6, No. 1, Jan. 1, 1992; pp. 42-50.
Hsiao et al.: "A High-Throughput and High-Capacity IPv6 Routing Lookup System", Computer Networks, Elsevier Science Publishers B.V., Amsterdam, NL, vol. 57, No. 3, Nov. 16, 2012, pp. 782-794.
Notice of Allowance dated Aug. 3, 2015; U.S. Appl. No. 14/207,146 (38 pgs.).
Notice of Allowance dated Sep. 17, 2015; U.S. Appl. No. 14/268,507 (15 pgs.).
International Search Report and Written Opinion for International Appln. No. PCT/US2014/051903 dated Jan. 27, 2015, 16 pages.
Final Office Action dated Feb. 13, 2015; U.S. Appl. No. 13/850,118; (14 p.).
U.S. Appl. No. 14/876,639, filed Oct. 6, 2015 by Agarwal et al.
Amendment to Carrier Multiple Access with Collision Detection (CSMA/CD Access Method and Physical Layer Specifications—Aggregation of Multi[ple Link Segments; IEEE Std. 802.3ad; 2000; 183 pages.
Appeal Brief Dated Jan. 18, 2013; U.S. Appl. No. 12/463,964 (23p.).
Brocade: "FastIron Ethernet Switch"; Administration Guide; Supporting FastIron Software Release 08.0.00; Apr. 30, 2013; 400 pages.
Brocade: "FastIron Ethernet Switch"; IP Multicast Configuration Guide; Supporting FastIron Software Release 08.0.00; Apr. 30, 2013; 212 pages.
Brocade: "FastIron Ethernet Switch"; Stacking Configuration Guide; Supporting FastIron Software Release 08.0.00; Apr. 30, 2013; 170 pages.
Brocade: "FastIron Ethernet Switch"; Traffic Management Guide; Supporting FastIron Software Release 08.0.00; Apr. 30, 2013; 76 pages.
Cisco: "Cisco StackWise and StackWise Plus Technology"; technical white paper; C11-377239-01; Oct. 2010; Copyright 2010; 11 pages.
Cisco: "Delivering High Availability in the Wiring Closet with Cisco Catalyst Switches"; technical white paper; C11-340384-01; Jan. 2007; Copyright 1992-2007; 8 pages.
Configure, Verify, and Debug Link Aggregation Control Program (LACP); allied Telesyn; 2004; 10 pages.
Dell: "Stacking Dell PowerConnect 7000 Series Switches"; A Dell Technical White Paper; Jul. 2011; 34 pages.
DLDP Techology White Paper; H3C products and solutions; 2008; 8 pages; http://www.h3c.com/portal/Products_Solutions/Technology/LAN/Technology_White_Paper/200812/623012_57_0.htm.
Examiners Answer dated May 7, 2013; U.S. Appl. No. 12/463,964 (12 p.).
Extreme Networks Technical Brief: "SummitStack Stacking Technology"; 1346_06; Dec. 2010; 8 pages.
Final Office Action dated Jan. 23, 2012; U.S. Appl. No. 12/463,964 (11 p.).

Fischer et al.: "A Scalable ATM Switching System Architecture"; IEEE Journal on Selected Areas in Communications, IEEE Service Center, Piscataway, US, vol. 9, No. 8, Oct. 1, 1991; pp. 1299-1307.
International Search Report and Written Opinion for International Appln. No. PCT/US2013/076251 dated May 22, 2014, 11 pages.
Juniper Networks datasheet entitled: "Juniper Networks EX 4200 Ethernet Switches with Virtual Chassis Technology"; Dated Aug. 2013 (12 p.).
Understanding and Configuring the Undirectional Link Detection Protocol Feature; Cisco support communication; Jul. 9, 2007; Document ID No. 10591; 5 pages; http://www.cisco.com/c/en/us/support/docs/lan-switching/spanning-tree-protocol/10591-77.html.
Link Aggregation According to IEEE Standard 802.3ad; SysKonnect GmbH; 2002; 22 pages.
Link Aggregation; http://en.wikipedia.org/wiki/Link_aggregation; downloaded from Internet on Dec. 16, 2013; 9 pages.
M. Foschiano; Cisco Systems UniDirectional Link Detection (UDLD) Protocol; Memo; Apr. 2008; 13 pages; Cisco Systems.
Migration from Cisco UDLD to industry standard DLDP; technical white paper; Feb. 2012; 12 pages; Hewlett-Packard Development Company.
Office Action dated Mar. 21, 2011; U.S. Appl. No. 12/463,964 (10 P.).
Partial International Search Report for PCT/US2014/051903 dated Nov. 18, 2014.
Reply Brief Dated Jul. 8, 2013; U.S. Appl. No. 12/463,964 (14 p.).
Response to Office Action dated Mar. 21, 2011; U.S. Appl. No. 12/463,964; Response filed Sep. 21, 2011 (12 p.).
Suckfuell: "Evolution of EWSD During the Eighties"; Institute of Electrical and Electronics Engineers; Global Telecommunications Conference; San Diego; Nov. 28-Dec 1, 1983; [Global Telecommunications Conference], New York, IEEE, US, vol. 2, Nov. 1, 1983; pp. 577-581.
U.S. Appl. No. 14/106,302, filed Dec. 13, 2013 by Lin et al.
U.S. Appl. No. 14/207,146, filed Mar. 12, 2014 by Lin et al.
U.S. Appl. No. 14/094,931, filed Dec. 3, 2013 by Lin et al.
U.S. Appl. No. 14/268,507, filed May 2, 2014 by Agarwal. (Unpublished.).
U.S. Appl. No. 14/171,152, filed Feb. 3, 2014 by Lin et al.
U.S. Appl. No. 14/485,343, filed Sep. 12, 2014 by Lin et al. (Unpublished.).
U.S. Appl. No. 14/506,943, filed Oct. 6, 2014 by Lin et al. (Unpublished.).
U.S. Appl. No. 14/530,193, filed Oct. 31, 2014 by Ravipati et al. (Unpublished.).
U.S. Appl. No. 61/745,396, filed Dec. 21, 2012 by Lin et al.
U.S. Appl. No. 61/799,093, filed Mar. 15, 2013 by Lin et al.
U.S. Appl. No. 61/822,216, filed May 10, 2013 by Lin et al.
U.S. Appl. No. 61/825,449, filed May 20, 2013 by Lin et al.
U.S. Appl. No. 61/825,451, filed May 20, 2013 by Lin et al.
U.S. Appl. No. 61/868,982, filed Aug. 22, 2013 by Lee.
U.S. Appl. No. 61/898,295, filed Oct. 31, 2013 by Agarwal.
U.S. Appl. No. 61/938,805, filed Feb. 12, 2014 by Ravipati et al.
U.S. Appl. No. 61/971,429, filed Mar. 27, 2014 by Sinha et al.
U.S. Appl. No. 61/974,924, filed Apr. 3, 2014 by Lin et al.
Office Action dated Apr. 29, 2016; U.S. Appl. No. 14/485,343; (72 pgs.).
Final Office Action dated Jun. 3, 2016; U.S. Appl. No. 14/106,302; (35 pgs.).
Rooney et al.: "Associative Ternary Cache for IP Routing", IEEE, pp. 409-416, 2004.
"Starburst: Building Next-Generation Internet Devices", Sharp et al., Bell Labs Technical Journal, Lucent Technologies, Inc., pp. 6-17, 2002.
NonFinal Office Action dated Jun. 23, 2016; U.S. Appl. No. 14/530,193; (73 pgs.).
NonFinal Office Action dated Jul. 13, 2016; U.S. Appl. No. 14/876,639; (69 pgs.).
Notice of Allowance dated Oct. 13, 2016; U.S. Appl. No. 14/106,302; (23 pgs.).
Final Office Action dated Aug. 24, 2016; U.S. Appl. No. 14/171,152; (39 pgs.).

(56) References Cited

OTHER PUBLICATIONS

NonFinal Office Action dated Nov. 9, 2016; U.S. Appl. No. 14/506,943; (18 pgs.).
Final Office Action dated Nov. 1, 2016; U.S. Appl. No. 14/485,343; (31 pgs.).
Notice of Allowance dated Dec. 14, 2015; U.S. Appl. No. 14/094,931 (25 pgs.).
U.S. Appl. No. 14/869,743, filed Sep. 29, 2015 by Agarwal et al.
U.S. Appl. No. 62/092,617, filed Dec. 16, 2014 by Agarwal et al.
Office Action dated Feb. 23, 2016; U.S. Appl. No. 14/171,152; (61 pgs.).
Notice of Allowance dated Jan. 6, 2017; U.S. Appl. No. 14/530,193; (18 pgs.).
Notice of Allowance dated Feb. 8, 2017; U.S. Appl. No. 14/876,639; (25 pgs.).
NonFinal Office Action dated Oct. 26, 2017; U.S. Appl. No. 14/869,743; (70 pgs.).
Notice of Allowance dated Aug. 24, 2017; U.S. Appl. No. 15/051,601; (23 pgs.).
Notice of Allowance dated Sep. 13, 2017; U.S. Appl. No. 14/171,152; (30 pgs.).
29—Chinese Office Action dated Jul. 24, 2017 Appln. No. 201510142392.X; 8 pages.
30—Pei et al.: Putting Routing Tables in Silicon, IEEE Network Magazine, Jan. 31, 1992, 9 pages.
31—Qingsheng et al.: Designing of Packet Processing Chip Routers, Aug. 31, 2001, China Academic Journal Electronic Publishing House, 4 pages (No English version).
32—Hsiao et al.: A High-Throughput and High-Capacity IPv6 Routing Lookup System, Nov. 16, 2012, Computer Networks, 13, pages.
NonFinal Office Action dated Mar. 23, 2017; U.S. Appl. No. 14/171,152; (14 pgs.).
Notice of Allowance dated Mar. 22, 2017; U.S. Appl. No. 14/506,943; (22 pgs.).
Notice of Allowance dated Apr. 13, 2017; U.S. Appl. No. 14/485,343; (25 pgs.).
NonFinal Office Action dated May 4, 2017; U.S. Appl. No. 15/051,601; (62 pgs.).
Chinese Office Action dated May 16, 2017 Appln. No. 201380065745.X.
Official Action RE: Chinese Application No. 201480039638.4, dated Feb. 5, 2018.
Notice of Allowance dated Oct. 30, 2015; U.S. Appl. No. 13/850,118 (12 pgs.).
Response to Office Action dated Jul. 16, 2015; U.S. Appl. No. 14/094,931; Response filed Nov. 12, 2015 (13 p.).
Office Action dated Nov. 20, 2015; U.S. Appl. No. 14/106,302; (14 pgs.).

\* cited by examiner

DEDICATED CONTROL PATH ARCHITECTURE FOR SYSTEMS OF DEVICES

CROSS REFERENCES TO RELATED APPLICATIONS

The present application claims the benefit and priority under 35 U.S.C. 119(e) of U.S. Provisional Application No. 61/868,982, filed Aug. 22, 2013, entitled "HIGH AVAILABILITY ARCHITECTURE FOR FIXED FORM-FACTOR CHASSIS SYSTEMS." The entire contents of this provisional application are incorporated herein by reference for all purposes.

BACKGROUND

As known in the art, a "stackable switch" is a network switch that can operate independently as a standalone device or in concert with one or more other stackable switches in a "stack" or "stacking system." FIG. 1A depicts the front face of an exemplary stackable switch 100. As shown, the front face includes a set of data ports 102 (denoted by the letter "D"), a set of stacking ports 104 (denoted by the letter "S"), and an out-of-band management port 106 (denoted by the letter "M"). Data ports 102 are operable for connecting stackable switch 100 to one or more hosts and/or networks. Stacking ports 104 are operable for connecting stackable switch 100 to other stackable switches in the same stacking system for the purpose of forming a larger, single logical switch comprising physical stackable switch 100 and the other physical switches. Stacking ports 104 can be dedicated ports (i.e., ports designed specifically for stacking) or high bandwidth data uplink ports that operate in a stacking mode. Out-of-band management port 106 is operable for connecting stackable switch 100 to a separate terminal device, such as a laptop or desktop computer. Once connected, an administrator can use the terminal device to access the management console of stackable switch 100 and perform various switch management functions.

FIG. 1B depicts certain internal components of stackable switch 100 of FIG. 1A. These internal components include a CPU complex 152 and a management function 150 for managing the operation of stackable switch 100. CPU complex 152 can include a general purpose processor, such as a PowerPC, Intel, AMD, or ARM-based CPU, that operates under the control of software stored in an associated memory (not shown). CPU complex 152 can also include other control and logic components, such as I/O interfaces (e.g., Ethernet), temperature sensors, a real-time clock, glue logic, memory, and so on. Management function 150, which can correspond to a subset of the components in CPU complex 152 configured to performed out-of-band management, is communicatively coupled with out-of-band management port 106. The internal components of stackable switch 100 further include a packet processing complex 155 which provides both a stacking function 154 and a data port function 156. Stacking function 154 (in conjunction with switch application software 153 running on CPU complex 152) provides the stacking functionality of stackable switch 100, while data port function 156 (in conjunction with switch application software 153) enables switch 100 to send and receive data traffic via data ports 102 and stacking ports 104. For example, data port function 156 and stacking function 154 can make wire-speed decisions on how to handle data packets flowing into or out of ports 102 and 104.

Generally speaking, the physical form factor of stackable switches such as switch 100 of FIGS. 1A and 1B is fixed—in other words, each stackable switch cannot be individually upgraded with, e.g., additional data port functions, additional management functions, or the like in order to increase the switch's capacity or capabilities. However, as mentioned above, such switches can be interconnected externally (via, e.g., cables or optical transceivers) to create a stacking system. To illustrate this, FIG. 2 depicts an exemplary stacking system 200 comprising stackable switches 100(1)-100(N), each of which is substantially similar to stackable switch 100 of FIGS. 1A and 1B. As shown, stackable switches 100(1)-100(N) are linked together via their respective stacking ports 104(1)-104(N), thereby establishing a data path 202 between the switches for communicating data traffic. With this configuration, stackable switches 100(1)-100(N) can act in concert as a single, logical switch having the combined data port capacity of the individual switches.

In the example of FIG. 2, stackable switch 100(2) is designated as the "master" switch of stacking system 200, which means that switch 100(2) serves as the point of decision making for the entirety of stacking system 200. For instance, master switch 100(2) can accept and process user commands directed to the overall configuration of stacking system 200. Master switch 100(2) can also communicate with non-master switches via the stacking ports in order to propagate various types of management commands and data to those switches.

In contrast to stacking system 200 of FIG. 2, FIG. 3 depicts an exemplary modular chassis system 300 (referred to herein as a "chassis system"). Chassis system 300 includes at least one management module (comprising a management processor) and at least one linecard module interconnected via a fabric module. Generally speaking, the stacking function of a stackable switch is similar to the fabric module of a chassis system, and the data port function of a stackable switch is similar to the line card data port function of a chassis system. However, in chassis system 300, each of these components is modular and can be added to, or removed from, chassis system 300 as needed in order to accommodate customer requirements. For instance, in the specific embodiment of FIG. 3, chassis system 300 includes two management modules 302(1) and 302(2) (for, e.g., redundancy) and three linecard modules 306(1), 306(2), and 306(3) (for, e.g., increased port capacity). Other configurations comprising more or fewer modules are possible, constrained only by the number of available module slots in chassis system 300. Thus, chassis system 300 can be considered an "internally expandable" switch system (via the additional or removal of internal management/fabric/linecard modules) while stacking system 200 of FIG. 2 can be considered an "externally expandable" switch system (via the addition or removal of external stackable switches).

One significant advantage that stacking systems have over modular chassis systems is cost; for instance, to achieve a particular data port capacity, it is usually cheaper to purchase and deploy a stacking system rather than a chassis system. However, the cost savings provided by stacking systems comes at the expense of less robust redundancy/high availability (HA) when compared to chassis systems. To understand this, note that in chassis system 300 of FIG. 3, each management module 302(1) and 302(2) has a direct connection to the other modules in system 300 via fabric module 304. Thus, the management processor of each management module knows the status of each linecard module, as well as the other management module, at all times. If one of the linecard modules fails, the management processor of the active management module can immediately isolate the faulty linecard module and re-route data traffic to another, available linecard module. Similarly, if one of the management modules fails, the other management module can take over active management duties to avoid traffic disruption.

On the other hand, in stacking system 200 of FIG. 2, the various CPU complexes of the system are not directly interconnected; instead, these CPU complexes can only communicate with the CPU complexes of their immediately adjacent stackable switches using data path 202 that is created via stacking ports 104(1)-104(N) interconnecting stackable switches 100(1)-100(N). Accordingly, if one of the stackable switches in system 200 fails, the management functions/CPU complexes of the other switches generally need to wait for a timeout on data path 202 before they can know that a failure has occurred. Further, if master switch 100(2) fails, a new master must be elected to re-form the stack. Both of these scenarios significantly increase the time needed to recover from a failure or sometimes cause traffic disruption, which means that stacking system 200 cannot provide robust HA (i.e., immediate failover with little or no downtime) for mission-critical deployments.

SUMMARY

A dedicated control path architecture for systems of devices, such as stacking systems, is provided. In one embodiment, a network device for use in a system of devices can comprise a CPU complex; a first set of ports for establishing a data path between the network device and other network devices in the system of devices; and a second set of ports for establishing a control path between the network device and the other network devices in the system of devices. The control path can be separate from the data path and can allow the CPU complex to exchange control plane traffic with other CPU complexes resident in the other network devices.

The following detailed description and accompanying drawings provide a better understanding of the nature and advantages of particular embodiments.

DETAILED DESCRIPTION

1. Overview

Figure 2:
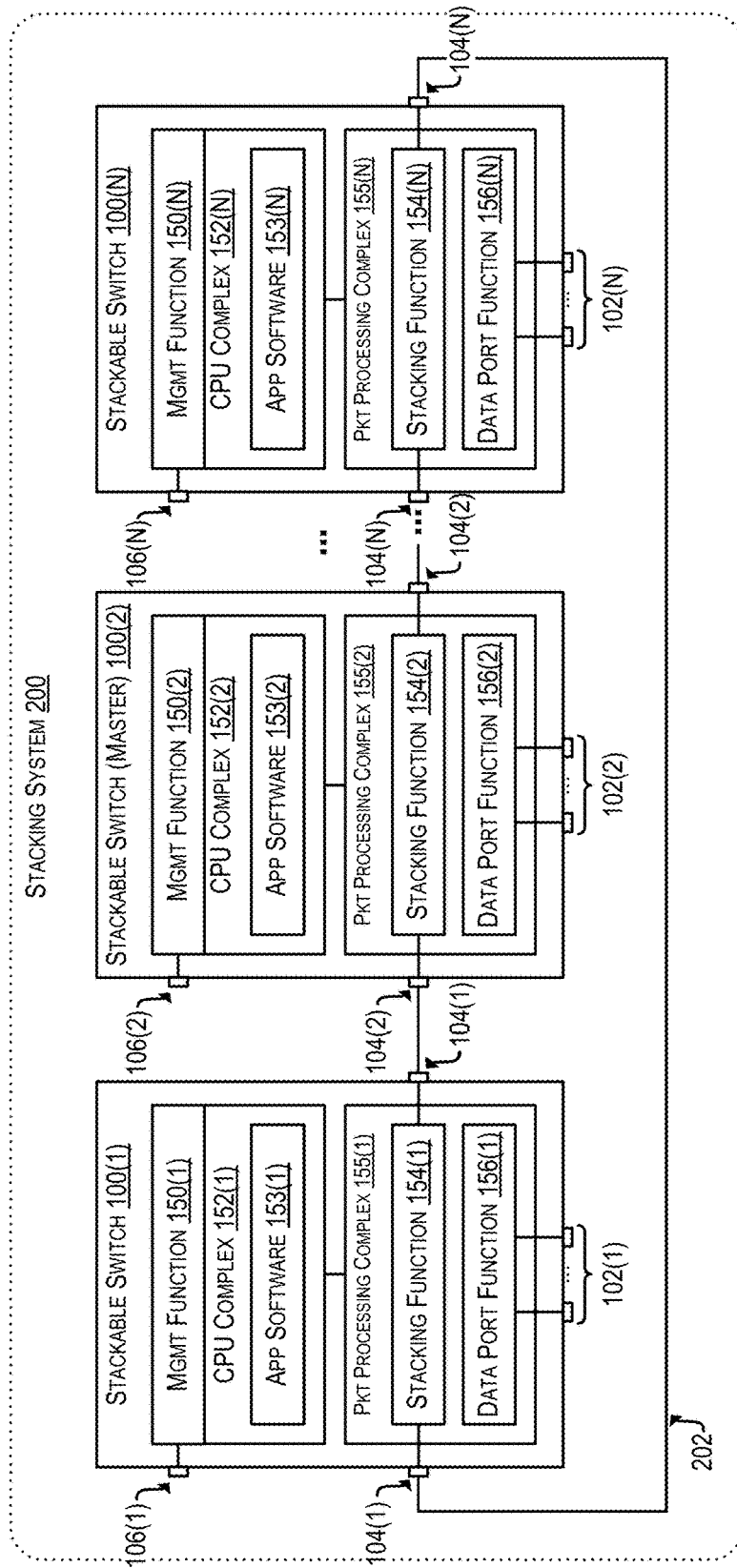
FIG. 2 depicts an exemplary stacking system.
Figure 3:
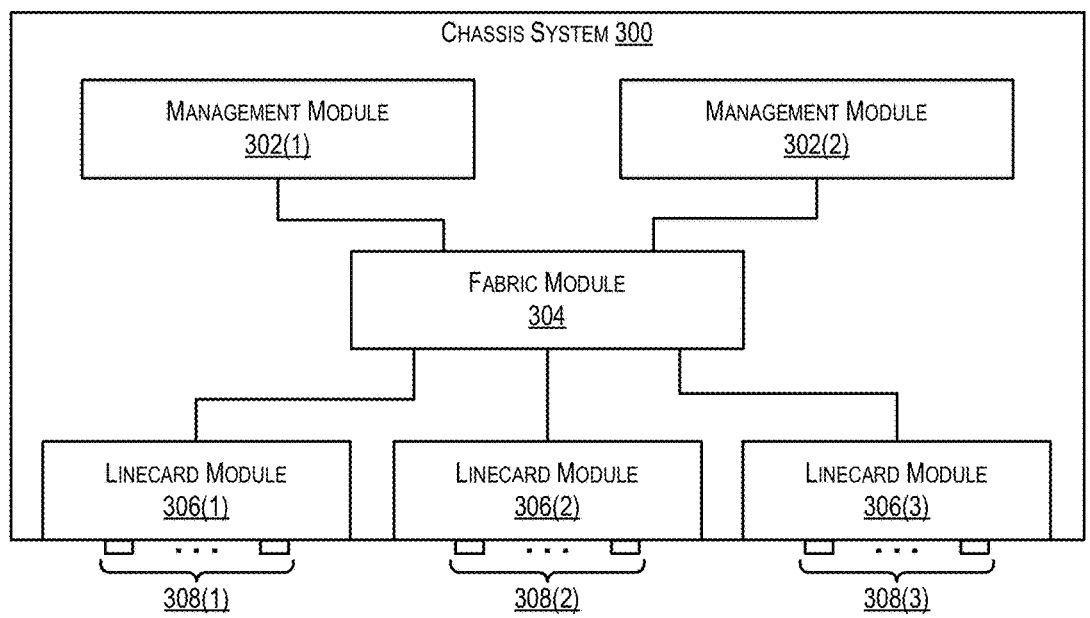
FIG. 3 depicts an exemplary modular chassis system.

The present disclosure describes a dedicated control path architecture for a system of devices, such as a stacking system comprising stackable switches. In one embodiment, each device in the system of devices can include a first set of ports for establishing a data path between the devices. For instance, as shown in exemplary stacking system 200 of FIG. 2, each stackable switch 100(1)-100(N) of system 200 includes stacking ports 104(1)-104(N) for establishing data path 202 between the switches. However, in addition the first set of ports, each device in the system of devices can also include a second set of ports (that are different from the first set of ports) for establishing a dedicated control path between the devices. This dedicated control path, which is not found in conventional stacking systems, can allow a CPU complex of the device to directly exchange control plane traffic with other CPU complexes resident in other devices in the system of devices. This capability, in turn, can enable or facilitate certain system-level features, such as robust HA, Software Defined Networking (SDN) interoperability, and more.

For example, with the dedicated control path described above, if one of the devices in the system of devices fails, the CPU complexes of the other devices can be notified immediately via the control path of the failure (without waiting for the data path to time out). As a result, the other CPU complexes can quickly react to the failure and failover traffic to the other devices, thereby providing a level of HA that is similar to modular chassis systems.

As another example, in scenarios where it is desirable to offload control plane processing to a central SDN controller, the CPU complex of each device in the system of devices can be directly connected, via the dedicated control path, to the SDN controller. This configuration can provide for more efficient and robust communication of control plane commands/data between the SDN controller and each individual CPU complex.

In the sections that follow, numerous examples and details are set forth in order to provide a thorough understanding of various embodiments. It should be appreciated, however, that certain embodiments can be practiced without some of these details, or can be practiced with modifications or equivalents thereof. For instance, although certain embodiments are described in the context of stacking systems in particular, the architecture described herein may also be applied to other types of networked systems where a dedicated control path would be useful or desirable, such as Ethernet or SAN fabrics. Thus, throughout the detailed description, the terms "switch" or "stackable switch" can be interchangeably swapped with the term "network device," and the terms "stack" or "stacking system" can be interchangeably swapped with the term "system of devices."

2. Hardware Implementation

Figure 1A:
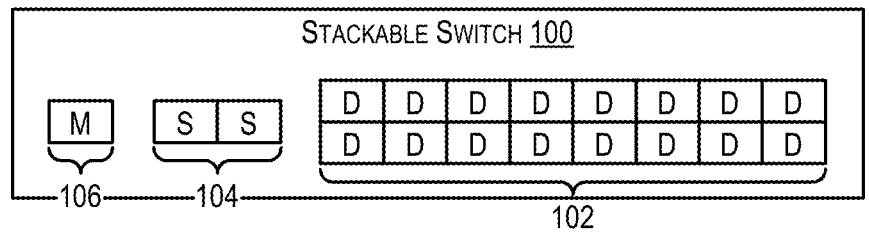
FIGS. 1A and 1B depict an exemplary stackable switch.
Figure 1B:
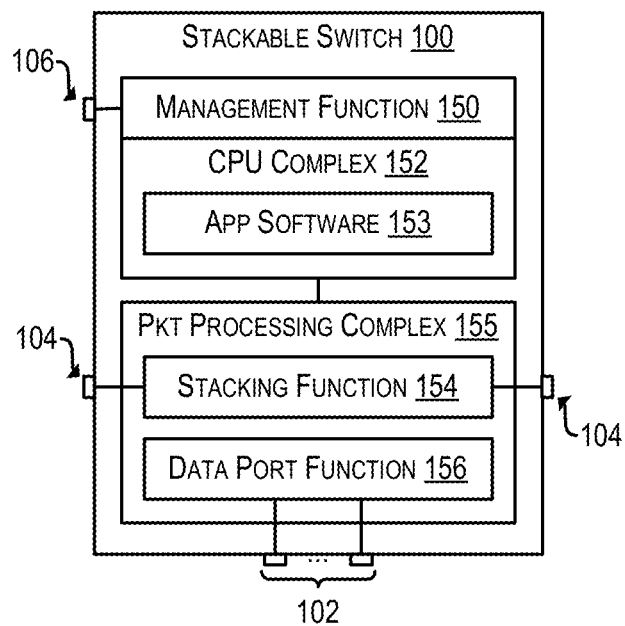
Figure 4A:
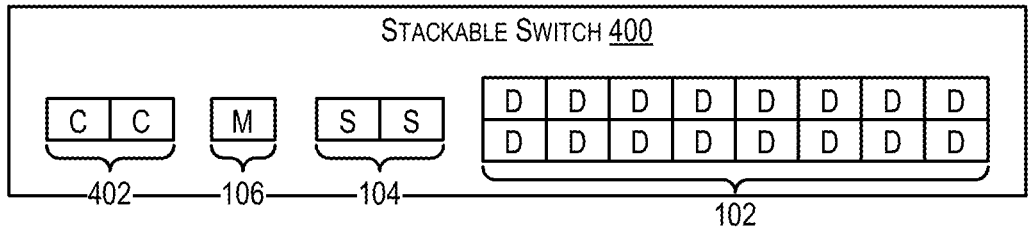
FIGS. 4A and 4B depict a stackable switch that supports a dedicated control path according to an embodiment.
Figure 4B:
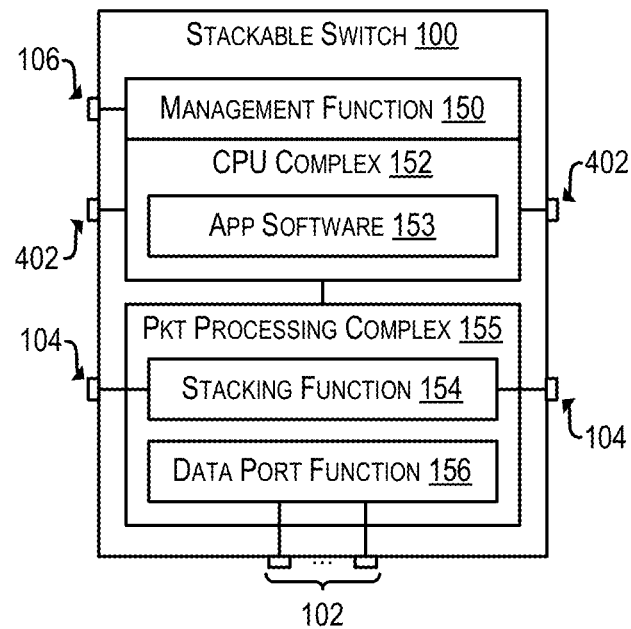

FIGS. 4A and 4B depict a stackable switch 400 that supports a dedicated control path architecture according to an embodiment. In particular, FIG. 4A depicts the front face of switch 400, while FIG. 4B depicts a simplified internal view of switch 400. As shown in these figures, stackable switch 400 includes a set of data ports 102, a set of stacking ports 104, an out-of-band management port 106, a CPU complex 152 running switch application software 153, a management function 150, and a packet processing complex 155 comprising a stacking function 154 and a data port function 156. All of these components are substantially similar to the like-numbered components described with respect to stackable switch 100 of FIGS. 1A and 1B. For example, CPU complex 152 can comprise a general purpose processor and zero or more additional components (e.g., memory, I/O interfaces, glue logic, temperature sensors, dedicated logic blocks, etc.) for performing various management functions of stacking switch 400. Further, packet processing complex 155 can comprise, e.g., a packet processor and zero or more additional components for processing internal system (i.e., stacking) data traffic (via stacking function 154) and processing ingress/egress data traffic (via data port function 156).

As noted in the Background section, one shortcoming with existing stackable switches and stacking systems is that the CPU complexes of such switches can only communicate with the CPU complexes of immediately adjacent switches in the system's topology via the data path created via their stacking ports. As a result, it is difficult (if not impossible) to implement certain features that rely on the timely exchange of control plane information between CPU complexes.

To address the foregoing and other similar issues, stackable switch 400 of FIGS. 4A and 4B includes a novel set of control ports 402 (denoted by the letter "C" in FIG. 4A). Unlike stacking ports 104 and data ports 102, these control ports are directly coupled with CPU complex 152, without passing through packet processing complex 155. In one embodiment, each control port 402 can be implemented using a standard RJ-45 connector (like a typical Ethernet port). In other embodiments, each control port 402 can be implemented using other connector form factors (e.g., micro-HDMI, USB, etc.).

Figure 5:
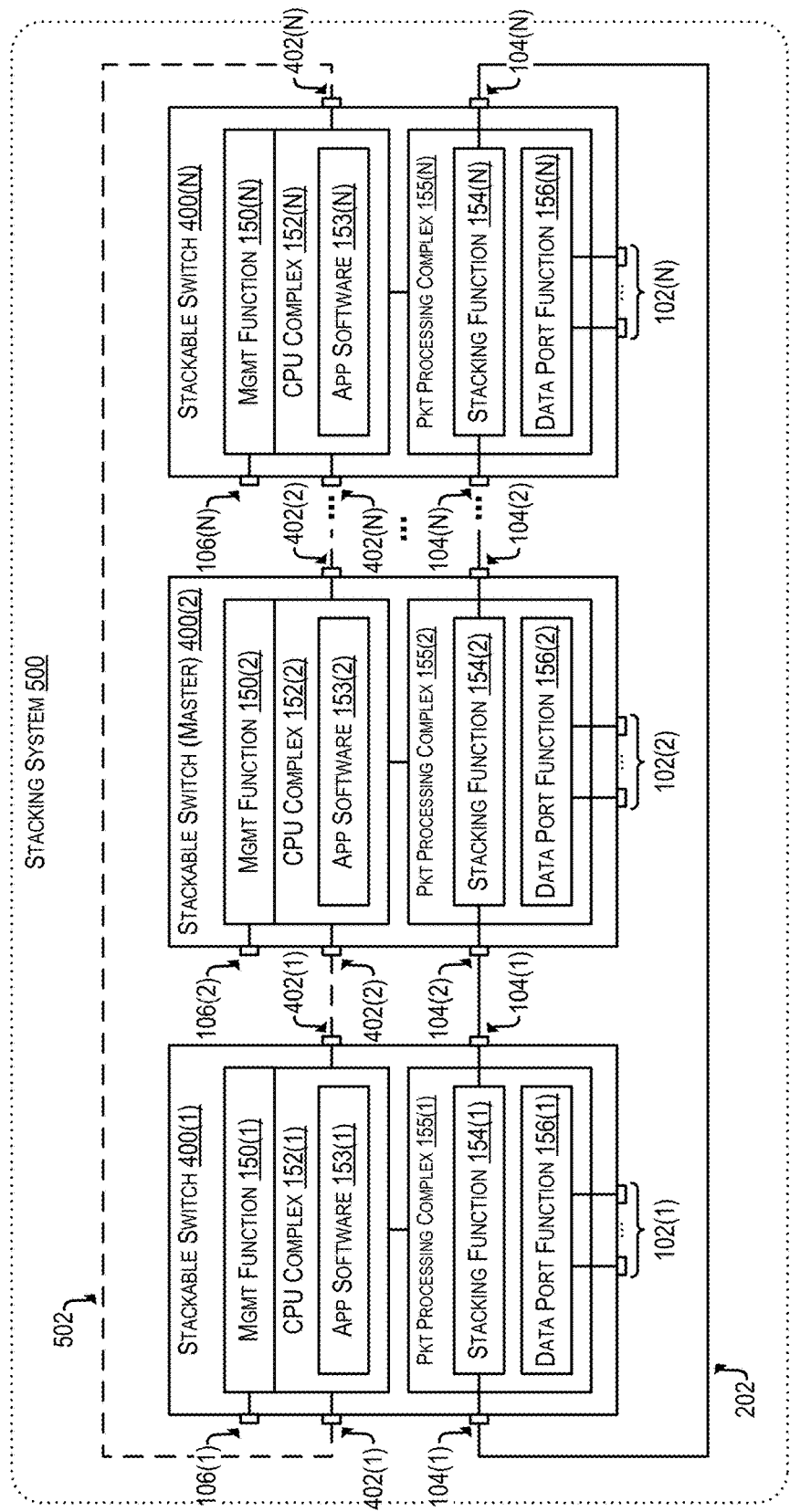
FIG. 5 depicts a stacking system comprising stackable switches similar to the stackable switch of FIG. 4 according to an embodiment.

Generally speaking, control ports 402 can establish a dedicated control path between CPU complex 152 of stackable switch 400 and the CPU complexes of other stackable switches in the same stacking system. For example, FIG. 5 depicts a stacking system 500 comprising stackable switches 400(1)-400(N), each of which is substantially similar to stackable switch 400 of FIGS. 4A and 4B. As shown, stackable switches 400(1)-400(N) are connected via their respective stacking ports 104(1)-104(N) to form a data path 202. At the same time, stackable switches 400(1)-400(N) are connected via their respective control ports 402(1)-402(N) to form a control path 502 that is separate from data path 202. Control path 502 is depicted via slashed lines to differentiate it from data path 202.

With control path 502, the various CPU complexes of stacking system 500 can communicate control plane traffic to each other in a direct fashion, without having to piggyback such traffic on data path 202 (which is primarily intended for data traffic). For example, in a particular embodiment, control path 502 can be used solely for communicating control plane traffic between the CPU complexes of stacking system 500, while data path 202 can be used for communicating data plane traffic (and/or non-urgent control plane traffic). Thus, control path 502 can emulate the point-to-point fabric connection that is available between management modules/processors in a modular chassis system. This means that stacking system 500 can effectively implement certain system features, like robust HA, that were previously only possible on high-cost chassis systems. This also means that stacking system 500 can implement other applications/features that benefit from a dedicated control path, such as SDN and so on. The HA and SDN use cases are described in further detail below.

It should be appreciated that FIGS. 4A, 4B, and 5 are illustrative and not intended to limit embodiments of the present invention. For example, although stackable switch 400 of FIGS. 4A and 4B is shown as including exactly two control ports 402, any number of such control ports may be supported.

Further, although each stackable switch 400(1)-400(N) of stackable system 500 of FIG. 5 is shown as being part of control path 502, in alternative embodiments, only a subset of the stackable switches in a stacking system may participate in the control path. For instance, consider a heterogeneous stacking system that comprises a mixture of high-end switches and low-end switches. Such a heterogeneous topology is supported by, e.g., Brocade Communications Systems, Inc.'s HyperEdge technology. In this type of stacking system, HA may only be needed for the high-end switches that make up the system's backbone, since the low-end switches are typically low in cost and thus can be replaced in their entireties if a failure of such a low-end switch occurs. Thus, only on the high-end switches may be interconnected via their respective control ports to communicate control plane traffic.

Figure 6:
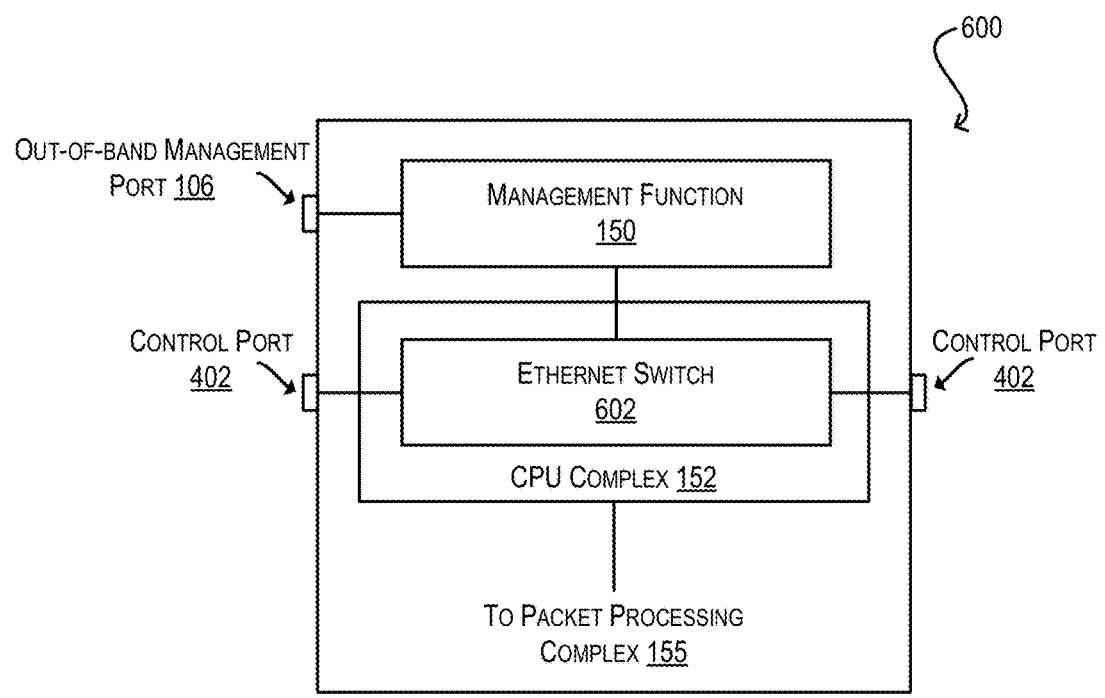
FIG. 6 depicts an internal configuration of the stackable switch of FIG. 4 according to an embodiment.

Yet further, control ports 402 of stackable switch 400 can be internally connected to the switch's CPU complex 152 in a number of different ways. For example, FIG. 6 depicts one possible configuration 600 within stackable switch 400 that involves connecting control ports 402, as well as out-of-band management port 106, to CPU complex 152 via a three-port Ethernet switch 602. In this configuration, management function 150 is separated from CPU complex 152, thereby decoupling the out-of-band management path used by out-of-band management port 106 from the in-band control path used by control ports 402. This configuration has the advantage of being relatively easy to implement in existing stackable switches that already have an Ethernet-based interface between out-of-band management port 106/management function 150 and CPU complex 152. In other embodiments, control ports 402 can be connected to CPU complex 152 via a dedicated interface that is not shared with out-of-band management port 106. One of ordinary skill in the art will recognize many variations, modifications, and alternatives.

3. HA Use Case

Figure 7:
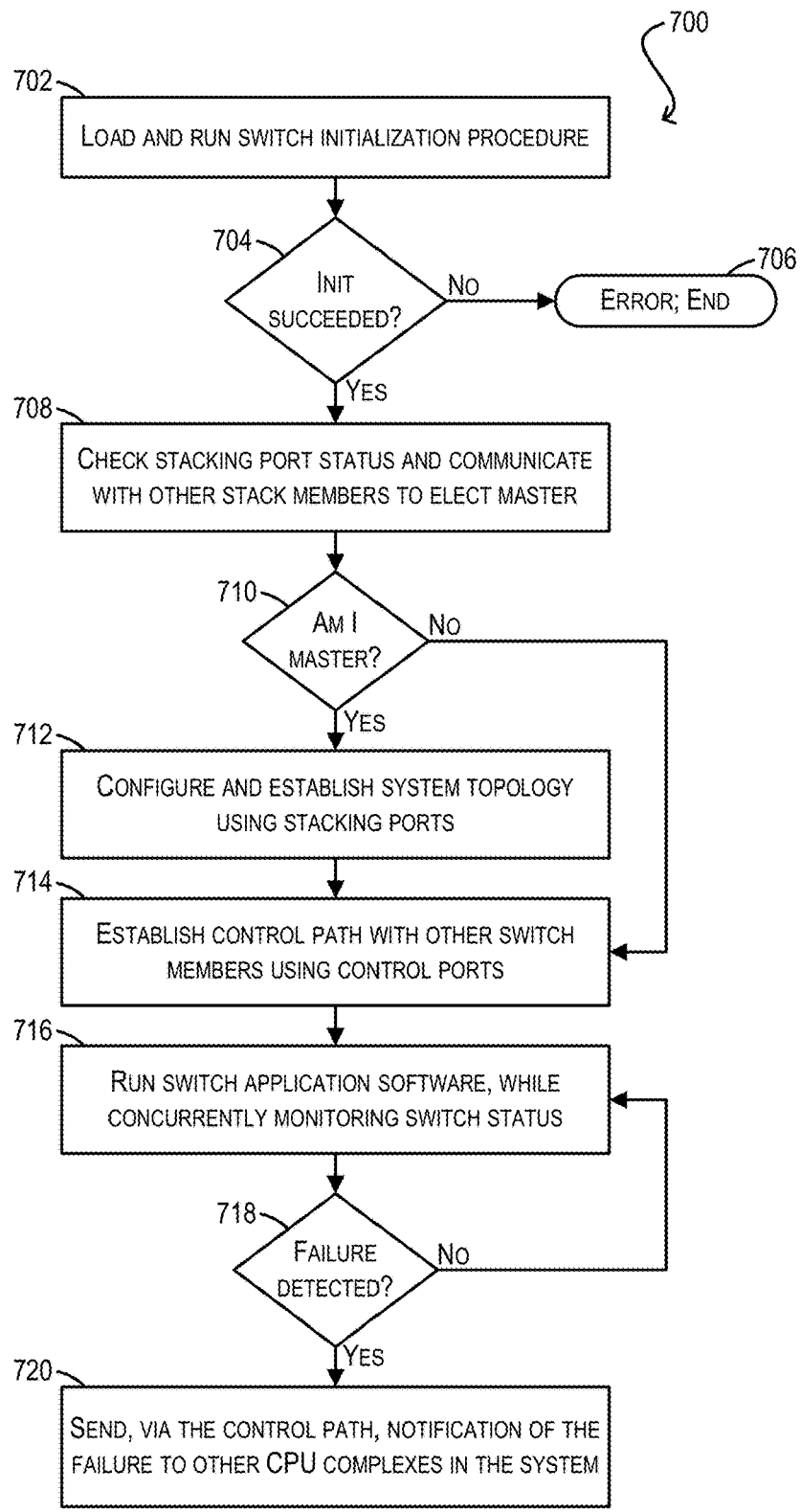
FIG. 7 depicts a flowchart that can be performed by each stackable switch of the stacking system of FIG. 5 for implementing HA according to an embodiment.

As discussed above, one use case for the dedicated control path shown in FIG. 5 (i.e., path 502) is to enable robust HA for stacking system 500. FIG. 7 depicts a high-level flowchart 700 that can be performed by each stackable switch 400(X) of stacking system 500 to implement HA according to an embodiment. Flowchart 700 assumes that stackable switch 400(X) has been recently powered-on or rebooted.

Starting with block 702, stackable switch 400(X) can first load and run its initialization procedure. This procedure can include, e.g., checking for system power and ensuring that the various sub-components of the switch (e.g., fans, power supply, logic boards, etc.) are operating as expected. If the initialization procedure fails, stackable switch 400(X) can throw an error and the entire startup process can end (blocks 704 and 706).

If the initialization procedure is successful, stackable switch 400(X) can move on to checking the statuses of its stacking ports and, assuming those port statuses are satisfactory, can communicate via the stacking ports with the other members of stacking system 500 to elect a master switch (blocks 704 and 708). This election process can be implemented using any of a number of known methods and thus is not detailed here.

At block 710, stackable switch 400(X) can check whether it has been elected as the master switch for stacking system 500. As noted previously, the elected master is generally responsible for managing the operation of the system. If stackable switch 400(X) has been elected as master, the switch can configure and establish a system topology/fabric for stacking system 500 through stacking ports 104(X) (block 712).

If stackable switch 400(X) has not been elected as master (or if the switch has completed block 712), stackable switch 400(X) can establish a control path (i.e., 502) with the other members of stacking system 500 using control ports 402(X) (block 714). In one embodiment, this step can comprise transmitting, by the switch's CPU complex, one or more control packets via control ports 402(X) to the CPU complexes of the other stack members, where the one or more control packets include an indication that the current switch is a part of the stack. In this way, the CPU complex of each stackable switch 400(1)-400(N) can be made aware of the presence/status of the other CPU complexes in stackable system 500 for the purpose of communicating control plane traffic to those other processors.

Once the control path has been established, stackable switch 400(X) can run its switch application software while concurrently monitoring its own status (e.g., the statuses of its ports, data port functions, stacking port functions, etc.) (block 716). If CPU complex 152(X) of stackable switch 400(X) detects that a failure has occurred, the processor can send, via the established control path, a notification of the failure to one or more other CPU complexes in stacking system 500 (blocks 718 and 720). For example, in one embodiment, CPU complex 152(X) can send the notification solely to the CPU complex of the master switch of system 500. In another embodiment, CPU complex 152(X) can send the notification to every other CPU complex that it is aware of (by virtue of the control packet exchange at block 714). The receiving CPU complexes can then take appropriate steps to failover over traffic from the failed switch to one or more other switches in the system (not shown).

On the other hand, if CPU complex 152(X) does not detect a failure at block 718, flowchart 700 can return to block 716 and stackable switch 400(X) can continue operating per its normal procedure until a failure is detected.

As noted previously, one advantage of the HA flowchart shown in FIG. 7 is that the CPU complex of each stackable switch can immediately notify, via the control path, the other CPU complexes that a failure has occurred. This is in contrast to existing stacking systems which do not have a dedicated control path, and thus must wait for a timeout on the data (i.e., stacking) path between switches before the failure of a stack member can be identified. As a result, the overall time needed to perform a failover operation with flowchart 700 is significantly less than in conventional stacking systems, and can be comparable to modular chassis systems. Short fail over time can prevent traffic disruption within the system and can prevent switches from shutting down due to system timeout.

In certain embodiments, instead of sending a notification to other CPU complexes upon detecting a failure (per block 720), each CPU complex 152(X) can send status/hello packets to the CPU complex of the master switch on a periodic interval. In these embodiments, the master switch can initiate a failover process if it does not receive a status/hello packet from a given switch within a predetermined period of time (indicating that a failure has occurred).

4. SDN Use Case

Figure 8:
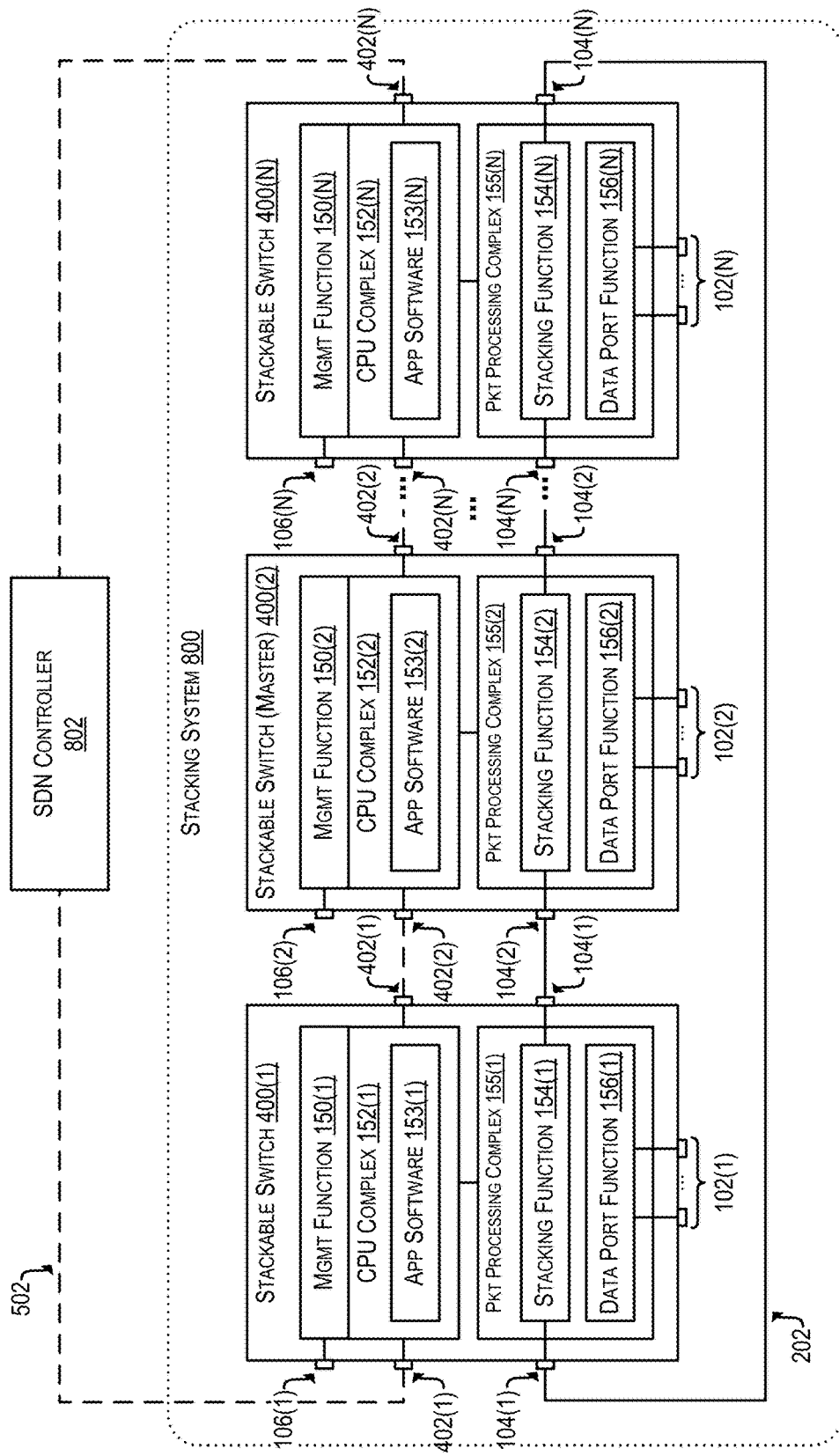
FIG. 8 depicts another stacking system comprising stackable switches similar to the stackable switch of FIG. 4 according to an embodiment.

In addition to enabling HA, dedicated control path 502 of FIG. 5 can also be used as a communication channel between the stackable switches in the stacking system and one or more SDN controllers. For example, FIG. 8 depicts a stacking system 800 that is similar to stacking system 500 of FIG. 5; however, in stacking system 800, stackable switches 400(1) and 400(N) are connected to an SDN controller 802 via their respective control ports 402(1) and 402(N). Thus, SDN controller 802 is within control path 502 and can send control plane commands directly to the CPU complexes of stackable switches 400(1)-400(N) via path 502, thereby enabling more efficient and robust communication for SDN applications.

Figure 9:
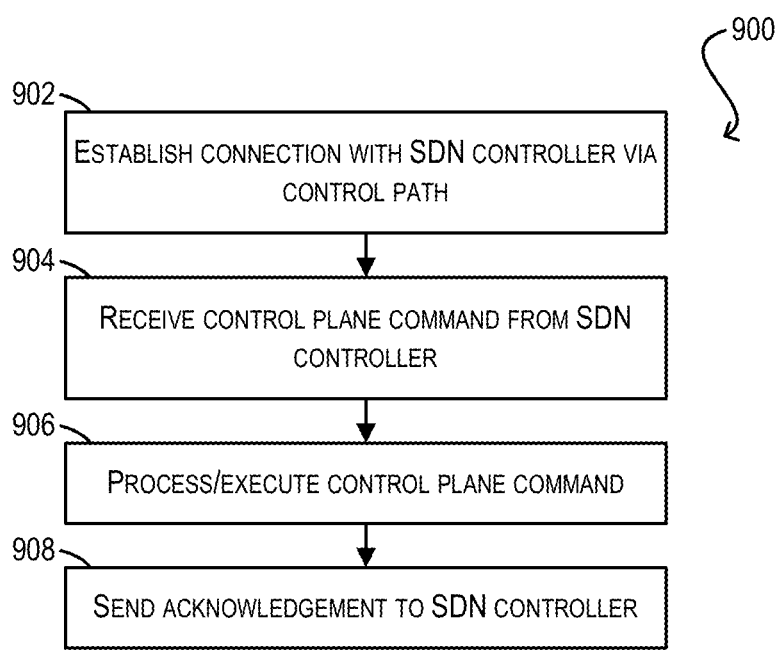
FIG. 9 depicts a flowchart that can be performed by each stackable switch of the stacking system of FIG. 8 for implementing SDN interoperability according to an embodiment.

FIG. 9 depicts a high-level flowchart 900 that can be performed by each stackable switch 400(X) of stacking system 800 for communicating with SDN controller 802 according to an embodiment. Flowchart 800 assumes that control path 502 has already been established via, e.g., a control packet exchange between switches 400(1)-400(3) similar to that described with respect to block 714 of FIG. 7.

At block 902, stackable switch 400(X) can establish a connection with SDN controller 802 via control path 502. In one embodiment, this step can involve configuring/verifying a common SDN protocol understood by switch 400(X) and SDN controller 802 (e.g., OpenFlow).

At block 904, stackable switch 400(X) can receive one or more control plane commands from SDN controller 802 via control path 502. The one or more control plane commands can include, e.g., commands for programming certain data structures/tables maintained by switch 400(X), commands for configuring certain switch applications or protocols, and so on.

At block 906, CPU complex 152(X) of stackable switch 400(X) can process/execute the control plane command(s) received at block 904. Finally, at block 908, CPU complex 152(X) can send an acknowledgement to SDN controller 802 indicating that the command has been successfully executed.

The above description illustrates various embodiments of the present invention along with examples of how aspects of the present invention may be implemented. The above examples and embodiments should not be deemed to be the only embodiments, and are presented to illustrate the flexibility and advantages of the present invention as defined by the following claims. For example, although certain embodiments have been described with respect to particular process flows and steps, it should be apparent to those skilled in the art that the scope of the present invention is not strictly limited to the described flows and steps. Steps described as sequential may be executed in parallel, order of steps may be varied, and steps may be modified, combined, added, or omitted. As another example, although certain embodiments have been described using a particular combination of hardware and software, it should be recognized that other combinations of hardware and software are possible, and that specific operations described as being implemented in software can also be implemented in hardware and vice versa.

The specification and drawings are, accordingly, to be regarded in an illustrative rather than restrictive sense. Other arrangements, embodiments, implementations and equivalents will be evident to those skilled in the art and may be employed without departing from the spirit and scope of the invention as set forth in the following claims.

What is claimed is:

1. A network switch for use in a system of network switches acting in concert as a single, logical switch, the network switch comprising:
 a general purpose processor operable for performing one or more management functions of the network switch;

a set of stacking ports for establishing a data path between the network switch and other network switches in the system of network switches;
a set of control ports for establishing a control path between the network switch and the other network switches in the system of network switches, the set of control ports being distinct from the set of stacking ports, the control path established between the network switch and the other network switches via the set of control ports being separate from the data path established between the network switch and the other network switches via the set of stacking ports; and
a non-transitory computer readable medium having stored thereon program code that, when executed by the general purpose processor, causes the general purpose processor to:
transmit, via the control path, a first control packet to other general purpose processors in the system of network switches, the first control packet identifying the network switch as a system member; and
subsequently to transmitting the first control packet:
monitor for failures of the network switch; and
upon detecting a failure, transmit, via the control path, a second control packet to at least one other general purpose processor in the system of network switches, the second control packet identifying the failure.

2. The network switch of claim 1 further comprising an out-of-band management port, wherein the out-of-band management port and the set of control ports are communicatively coupled with the general purpose processor via an Ethernet switch that is internal to the network switch.

3. The network switch of claim 1 wherein the at least one other general purpose processor is a master general purpose processor resident in a master switch of the system of network switches.

4. The network switch of claim 1 wherein, upon receiving the second control packet, the general purpose processor cooperates with the other general purpose processors to failover over network functions from the network switch to one or more other network switches in the system of network switches.

5. The network switch of claim 1 wherein the set of control ports further establish a control path between the network switch and a Software Defined Networking (SDN) controller.

6. The network switch of claim 5 wherein the program code further causes the general purpose processor to:
receive, via the control path between the network switch and the SDN controller, a control plane command from the SDN controller;
process the control plane command; and
transmit an acknowledgement to the SDN controller.

7. The network switch of claim 1 wherein the system of network switches includes one or more high-end switches and one or more low-end switches, and
wherein the control path passes through only the one or more high-end switches without passing through any of the one or more low-end switches.

8. A method performed by a network switch useable in a system of network switches acting in concert as a single, logical switch, the method comprising:
establishing, by the network switch via a set of stacking ports, a data path between the network switch and other network switches in the system of network switches;
establishing, by the network switch via a set of control ports, a control path between the network switch and the other network switches in the system of network switches, the set of control ports being distinct from the set of stacking ports, the control path established between the network switch and the other network switches via the set of control ports being separate from the data path established between the network switch and the other network switches via the set of stacking ports;
transmitting, via the control path, a first control packet to other general purpose processors in the system of network switches, the first control packet identifying the network switch as a system member; and
subsequently to transmitting the first control packet:
monitoring for failures of the network switch; and
upon detecting a failure, transmitting, via the control path, a second control packet to at least one other general purpose processor in the system of network switches, the second control packet identifying the failure.

9. The method of claim 8 wherein the network switch further comprises an out-of-band management port, and wherein the out-of-band management port and the set of control ports are communicatively coupled with the general purpose processor via an Ethernet switch that is internal to the network switch.

10. The method of claim 8 wherein the at least one other general purpose processor is a master general purpose processor resident in a master switch of the system of network switches.

11. The method of claim 8 wherein, upon receiving the second control packet, the general purpose processor cooperates with the other general purpose processors to failover over network functions from the network switch to one or more other network switches in the system of network switches.

12. The method of claim 8 further comprising:
establishing, via the set of control ports, a control path between the network switch and a Software Defined Networking (SDN) controller.

13. The method of claim 12 further comprising, by the general purpose processor:
receiving, via the control path between the network switch and the SDN controller, a control plane command from the SDN controller;
processing the control plane command; and
transmitting an acknowledgement to the SDN controller.

14. The method of claim 8 wherein the system of network switches includes one or more high-end switches and one or more low-end switches, and
wherein the control path passes through only the one or more high-end switches without passing through any of the one or more low-end switches.

15. A non-transitory computer readable medium having stored thereon program code executable by a general purpose processor of a network switch for use in a system of network switches acting in concert as a single, logical switch, the program code comprising:
code that causes the general purpose processor to establish, via a set of stacking ports of the network switch, a data path between the network switch and other network switches in the system of network switches;
code that causes the general purpose processor to establish, via a set of control ports of the network switch, a control path between the network switch and the other network switches in the system of network switches, the control path established between the network switch and the other network switches by the set of control ports being separate from the data path established between the network switch and the other network switches by the set of stacking ports;

code that causes the general purpose processor to transmit, via the control path, a first control packet to other general purpose processors in the system of network switches, the first control packet identifying the network switch as a system member; and code that causes the general purpose processor to, subsequently to transmitting the first control packet:
monitor for failures of the network switch; and
upon detecting a failure, transmit, via the control path, a second control packet to at least one other general purpose processor in the system of network switches, the second control packet identifying the failure.

16. The non-transitory computer readable medium of claim 15 wherein the network switch further comprises an out-of-band management port, and wherein the out-of-band management port and the set of control ports are communicatively coupled with the general purpose processor via an Ethernet switch that is internal to the network switch.

17. The non-transitory computer readable medium of claim 15 wherein the at least one other general purpose processor is a master general purpose processor resident in a master switch of the system of network switches.

18. The non-transitory computer readable medium of claim 15 wherein, upon receiving the second control packet, the general purpose processor cooperates with the other general purpose processors to failover over functions from the network switch to one or more other network switches in the system of network switches.

19. The non-transitory computer readable medium of claim 15 wherein the program code further comprises:
code that causes the network switch to establish, via the set of control ports, a control path between the network switch and a Software Defined Networking (SDN) controller.

20. The non-transitory computer readable medium of claim 19 wherein the program code further comprises:
code that causes the general purpose processor to receive, via the control path between the network switch and the SDN controller, a control plane command from the SDN controller;
code that causes the general purpose processor to process the control plane command; and
code that causes the general purpose processor to transmit an acknowledgement to the SDN controller.

21. The non-transitory computer readable medium of claim 15 wherein the system of network switches includes one or more high-end switches and one or more low-end switches, and
wherein the control path passes through only the one or more high-end switches without passing through any of the one or more low-end switches.

* * * * *